United States Patent
Enoki et al.

(10) Patent No.: US 9,352,718 B2
(45) Date of Patent: May 31, 2016

(54) BASE FABRIC FOR AIRBAGS

(71) Applicant: ASAHI KASEI FIBERS CORPORATION, Osaka-shi, Osaka (JP)

(72) Inventors: Masato Enoki, Tokyo (JP); Fumiaki Ise, Tokyo (JP)

(73) Assignee: ASAHI KASEI FIBERS CORPORATION, Osaka-Shi (JP)

( * ) Notice: Subject to any disclaimer, the term of this patent is extended or adjusted under 35 U.S.C. 154(b) by 0 days.

(21) Appl. No.: 14/383,835

(22) PCT Filed: Mar. 7, 2013

(86) PCT No.: PCT/JP2013/056331
§ 371 (c)(1),
(2) Date: Sep. 8, 2014

(87) PCT Pub. No.: WO2013/133382
PCT Pub. Date: Sep. 12, 2013

(65) Prior Publication Data
US 2015/0115574 A1    Apr. 30, 2015

(30) Foreign Application Priority Data
Mar. 9, 2012  (JP) ................ 2012-053185

(51) Int. Cl.
*B60R 21/16* (2006.01)
*B60R 21/235* (2006.01)
(Continued)

(52) U.S. Cl.
CPC ............... *B60R 21/235* (2013.01); *D03D 1/02* (2013.01); *D06M 13/513* (2013.01);
(Continued)

(58) Field of Classification Search
USPC ................ 280/743.1; 442/136, 60, 152, 189; 427/393.3
See application file for complete search history.

(56) References Cited

U.S. PATENT DOCUMENTS 5,865,464 A * 2/1999 Kanuma et al. ............ 280/743.1
6,283,507 B1 * 9/2001 Kami et al. ................ 280/743.1
(Continued)

FOREIGN PATENT DOCUMENTS

JP    1-135683    5/1989
JP    3-294542    12/1991
(Continued)

OTHER PUBLICATIONS

Notification of Transmittal of Translation of the International Preliminary Report on Patentability, International Preliminary Report on Patentability, and Translation of the Written Opinion of the International Searching Authority, for International Patent Application No. PCT/JP2013/056331, mailed Sep. 18, 2014 (9 pages).
(Continued)

*Primary Examiner* — Toan To
(74) *Attorney, Agent, or Firm* — Finnegan, Henderson, Farabow, Garrett & Dunner, L.L.P.

(57) ABSTRACT

The purpose of the present invention is to provide a base fabric for airbags with excellent deployment speed, internal pressure retention and workability, and an airbag using the same. The inventive base fabric for airbags has resin arranged in at least one surface of the cloth which comprises synthetic fibers, and is characterized in that the amount of resin adhered is from 10 to 50 g/m² and, further, the weaving thread's filaments is exposed on the resin surface, and the weaving thread's filaments exposure rate is from 1 to 25%.

13 Claims, 4 Drawing Sheets (51) Int. Cl.
*D06M 15/643* (2006.01)
*D06M 13/513* (2006.01)
*D03D 1/02* (2006.01)
*D06N 7/00* (2006.01)
*D06N 3/00* (2006.01)
*D06N 3/12* (2006.01)
*D06M 101/34* (2006.01)

(52) U.S. Cl.
CPC ......... *D06M 15/643* (2013.01); *D06N 3/0034* (2013.01); *D06N 3/0059* (2013.01); *D06N 3/128* (2013.01); *D06N 7/0092* (2013.01); *B60R 2021/23514* (2013.01); *B60R 2021/23519* (2013.01); *D06M 2101/34* (2013.01); *D06N 2209/108* (2013.01); *D06N 2209/125* (2013.01); *D06N 2213/045* (2013.01); *D10B 2505/124* (2013.01); *Y10T 428/2481* (2015.01); *Y10T 442/2861* (2015.04); *Y10T 442/2893* (2015.04)

(56) References Cited

U.S. PATENT DOCUMENTS

| | | | |
|---|---|---|---|
| 6,601,614 B1* | 8/2003 | Ishii | 139/389 |
| 8,883,659 B2* | 11/2014 | Ise | 442/168 |
| 2002/0020992 A1* | 2/2002 | Kanuma | 280/730.2 |
| 2005/0054762 A1 | 3/2005 | Yaginuma et al. | |
| 2005/0170723 A1 | 8/2005 | Okada | |
| 2007/0007756 A1* | 1/2007 | Okuno et al. | 280/743.1 |
| 2007/0031621 A1 | 2/2007 | Morimoto et al. | |
| 2008/0042414 A1* | 2/2008 | Nagaoka | 280/743.1 |
| 2009/0215343 A1 | 8/2009 | Lopez et al. | |
| 2010/0295283 A1 | 11/2010 | Yamada et al. | |
| 2013/0147170 A1* | 6/2013 | Tanaka et al. | 280/743.1 |

FOREIGN PATENT DOCUMENTS

| | | |
|---|---|---|
| JP | 2002-266194 | 9/2002 |
| JP | 2003-72499 | 3/2003 |
| JP | 2004-332121 | 11/2004 |
| JP | 2005-82669 | 3/2005 |
| JP | 2006-69409 | 3/2006 |
| JP | 2006-169645 | 6/2006 |
| JP | 3855775 B2 | 12/2006 |
| JP | 2007-162187 | 6/2007 |
| JP | 2008-50716 | 3/2008 |
| JP | 2008-138305 | 6/2008 |
| JP | 2009-185421 | 8/2009 |
| JP | 2010-13770 | 1/2010 |
| JP | 5429603 B | 2/2014 |
| WO | WO 2004/031472 | 4/2004 |
| WO | WO 2008/020605 | 2/2008 |
| WO | WO 2009/084334 A1 | 7/2009 |

OTHER PUBLICATIONS

Supplementary European Search Report issued in European Application No. 13757302.8, dated Jul. 24, 2015, 3 pages.

English-language International Search Report from the Japanese Patent Office, mailed May 14, 2013. for International Application No. PCT/JP2013/056331.

\* cited by examiner

GAS INSERTION PORT

FIG. 5

BASE FABRIC FOR AIRBAGS

TECHNICAL FIELD

The present invention relates to an airbag that protects passengers from impact during an automobile or other vehicular collision, and more particularly, relates to the providing of an airbag and base fabric for airbags that demonstrate superior deployment speed, internal pressure retention and workability.

BACKGROUND ART

The rate at which airbags have been installed in automobiles as safety equipment has improved rapidly. These airbags protect the bodies of passengers by preventing the bodies of passengers from colliding with interior vehicle components, walls or glass by being rapidly inflated with high-pressure gas from an inflator to allow the gas to cause the airbag to be deployed at a high speed at the time of an automobile accident involving a collision. In recent years, there has been a growing need in the automobile industry to increase the deployment speed of airbags following an automobile collision from the viewpoint of improving passenger protection.

In addition, this type of safety equipment has been expanded to include side bags and side curtains from the viewpoint of side-protecting for passengers. These side curtain bags are required to prolong the time the bag is maintained in a deployed state, or in other words, improve internal pressure retention, in order to reduce impacts applied to passengers during a rollover from the viewpoint of improving passenger safety during an accident involving a vehicle rollover. Consequently, the usage rate of resin-coated base fabrics (coated with materials containing substances known as elastomers) that reduce air permeability is increasing for use as airbag base fabric.

The air permeability of base fabrics has previously been reduced by increasing the amount of coated resin in order to obtain a coated base fabric having superior internal pressure retention. However, the coated surfaces end up adhering and have difficulty separating due to the adhesiveness of the resin. Although airbags are folded before being housed in an automobile, since coated surfaces adhere to each other at that time, this hinders the smooth inflation of the airbags at the time of deployment.

In addition, when sewing the base fabric, work ends up being interrupted each time coated surfaces make contact due to the high level of adhesiveness of the resin coated on the base fabric, thereby resulting in the occurrence of decreases in working efficiency and workability.

In order to prevent this adhesion, the following Patent Document 1 discloses that deployment properties are improved by adding a lubricant and inorganic compound to a coating agent or forming a fine pattern of surface irregularities on a silicone surface. However, this has the shortcoming of making the processing process complex.

Moreover, since airbag base fabrics easily become electrostatically charged, in addition to being difficult to handle during processing, there was also concern over the static electricity having a detrimental effect on automobile electronic control equipment when installed in an automobile. Patent Document 2 indicates that a base fabric consisting of silicone coated onto a Nylon 66 base fabric demonstrates higher charging properties than uncoated base fabric. This is thought to be due to the nylon and silicone being positioned at both poles of an charging series. Patent Document 2 discloses a method for controlling electrical charge with the seam of the base fabric by using an electrically conductive suturing thread. In addition, Patent Document 3 discloses a method for controlling electrical charge by blending an electrically conductive thread when weaving the base fabric. However, not only is the use of a special electrically conductive thread economically unsuitable, since fibers containing an electrically conductive substance have different properties with respect to mechanical properties and the like, there is the problem of the creation of mechanical weakness.

At present, there are no known airbags or airbag base fabrics that are able to solve the aforementioned problems and demonstrate superior deployment speed, internal pressure retention and workability.

PRIOR ART DOCUMENTS

Patent Documents

Patent Document 1: Japanese Unexamined Patent Publication No. 2004-332121
Patent Document 2: Japanese Unexamined Patent Publication No. 2006-169645
Patent Document 3: Japanese Unexamined Patent Publication No. 2006-69409

SUMMARY OF THE INVENTION

Problems to be Solved by the Invention

An object of the present invention is to provide an airbag base fabric for airbags that demonstrates superior deployment speed, internal pressure retention and workability. In particular, an object of the present invention is to provide a coated base fabric capable of being used in airbags that demonstrates superior deployment speed, internal pressure retention and workability without providing a coating layer for the surface layer thereof.

Means to Solve the Problems

As a result of conducting extensive studies to obtain superior deployment speed, internal pressure retention and workability that were unable to be realized by conventional coated base fabrics, the inventors of the present invention found that adhesion of the coating resin can be prevented by using surface irregularities formed by the warp threads and weft threads in the fabric to expose the apical portions of surface irregularities of the weaving thread on the surface of the coating resin. In other words, it was found that adhesion between coating resin surfaces can be inhibited by allowing the coating resin surface and the single fibers of the weaving thread to make point contact. Moreover, it was also found that electrostatic charging due to separation is inhibited between coating resin surfaces and non-coating fiber surfaces, thereby leading to completion of the present invention. Namely, the present invention is as indicated below.

(1) A base fabric for airbags having a resin arranged on at least one side of a fabric composed of synthetic fibers, wherein the coated amount of resin is 10 $g/m^2$ to 50 $g/m^2$, weaving thread's filaments is exposed on the resin surface, and the weaving thread's filaments exposure rate is 1% to 25%.

(2) The base fabric for airbags described in (1) above, wherein the solvent-extracted oil content is 0.15% by weight to 0.005% by weight.

(3) The base fabric for airbags described in (1) or (2) above, wherein the weaving thread flatness of a cross-section of the weaving thread is 2.0 to 6.0 for both the warp yarn and weft yarn.

(4) The base fabric for airbags described in any one of (1) to (3) above, wherein the resin is silicone.

(5) The base fabric for airbags described in any one of (1) to (4) above, wherein the synthetic fibers are polyamide fibers.

(6) The base fabric for airbags described in any one of (1) to (5) above, wherein the base fabric has been inkjet-printed.

(7) The base fabric for airbags described in any one of (1) to (6) above, wherein the resin is arranged by coating a coating liquid resin onto the fabric surface.

(8) The base fabric for airbags described in (7) above, wherein the viscosity of the coating liquid resin is 15,000 cP to 500,000 cP.

(9) The base fabric for airbags described in (7) or (8) above, wherein 1% by weight to 10% by weight of a low molecular weight alkoxysilane is added to the coating liquid resin.

(10) The base fabric for airbags described in any one of (7) to (9) above, wherein the coating liquid resin contains a low viscosity resin component having viscosity in excess of 500 cP but less than 10,000 cP.

(11) The base fabric for airbags described in any one of (7) to (10), wherein the contact pressure between the base fabric and knife used during coating is 0.5 N/cm to 20 N/cm.

(12) An airbag composed of the base fabric for airbags described in any one of (1) to (11) above.

(13) An airbag module that uses the airbag described in (12) above.

Effects of the Invention

According to the present invention, an airbag and base fabric for air bags can be obtained that demonstrate superior deployment speed, internal pressure retention and workability.

MODE FOR CARRYING OUT THE INVENTION

The following provides a detailed explanation of the present invention.

Weaving thread's filaments exposure rate in the present invention is obtained by the measurement method indicated below. The following provides an explanation thereof using the example of a silicone resin coating shown in FIG. 1 and FIG. 2.

Figure 2:
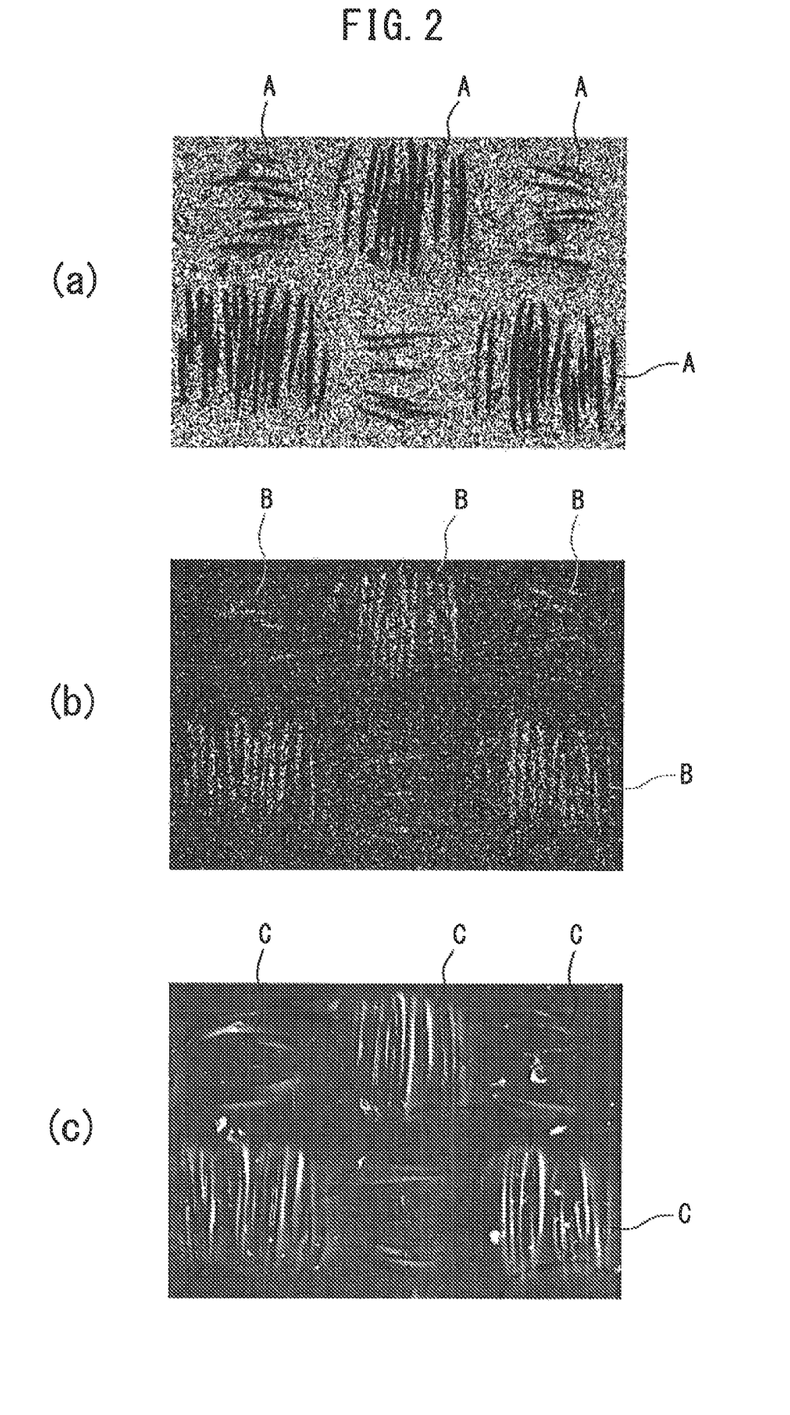
FIG. 2 indicates examples of photographs depicting the distribution of silicon and carbon on the surface of a silicone-coated base fabric obtained according to the present invention.

Distribution diagrams of silicon (Si) derived from the coating resin in the form of silicone and carbon (C) derived from the weaving thread's filaments are obtained by photographing the resin coated surface of the base fabric of the present invention under the conditions indicated below with a scanning electron microscope (SEM) system (S3400N, Hitachi, Ltd.) and energy-dispersive X-ray spectroscopy (EDX) system (INCAx-ac, Oxford Instruments plc) followed by subjecting the photographs to image processing.

Pretreatment: Carbon coating (100 Å to 200 Å)
Accelerating voltage: 15 kV
Working distance: 10 mm
Mapping collection time: Approx. 220 seconds FIG. 2(a) indicates an example of a silicon mapping distribution diagram, and those portions indicated by "A" in the diagram indicate portions where silicon is absent and where filament of the weaving thread (warp yarn and weft yarn) are exposed on the surface of the coating resin. FIG. 2(b) indicates an example of a carbon mapping distribution diagram, and those portions indicated by "B" in the diagram indicate portions where carbon is present and where filament of weaving thread (warp yarn and weft yarn) are exposed on the surface. The locations of "A" in FIG. 2(a) and the locations of "B" in FIG. 2(b) can be understood to closely coincide. Furthermore, FIG. 2(c) indicates the results of observing with an SEM, weaving thread (warp yarn and weft yarn) is observed at the locations of "C" in the diagram, and those locations can be understood to closely coincide with the locations of "A" in FIG. 2(a) and "B" in FIG. 2(b).

The area where silicon is absent (S1) is measured based on the image of the silicon mapping distribution diagram of FIG. 2(a) for those sites where weaving threads were observed to be exposed by SEM observation, and the weaving thread's filaments exposure rate is calculated according to the equation below.

Weaving thread's filaments exposure rate (%)=(S1/S0)×100

Figure 1:
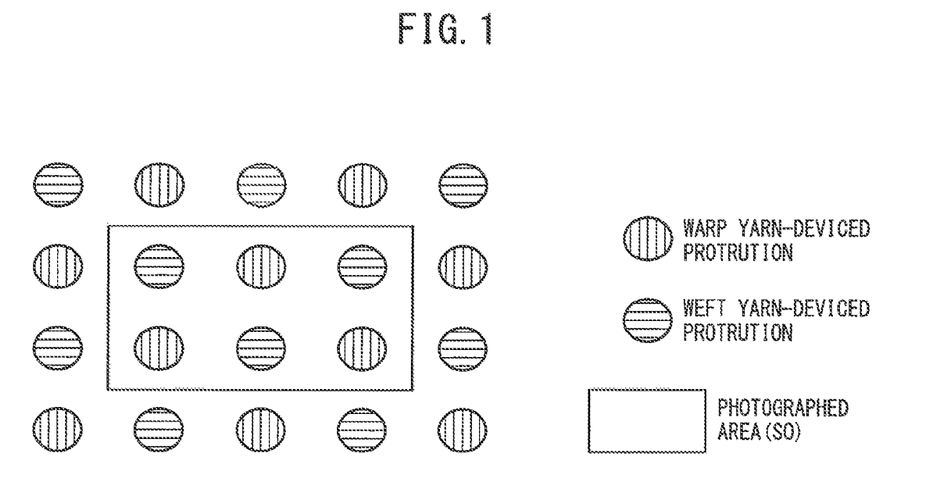
FIG. 1 is a drawing for explaining a method for calculating weaving thread's filaments exposure rate.

In the above equation, S0 represents the photographed area, and is the area surrounded by the apices of protrusions derived from the warp yarn and the apices of protrusions derived from the weft yarn as shown in FIG. 1. An area is selected for the photographed area so as to contain at least four protrusion apices, and the outline thereof lies intermediate to the adjacent warp and weft yarns.

In addition, since weaving thread's filaments exposure rate was able to be confirmed from the absence of silicon on the silicone resin coated surface, backscattered electron (BSE) images can be obtained at a low vacuum of about 40 Pa using a backscattered electron detector, and weaving thread's filaments exposure rate can also be measured for silicone resin coated portions consisting mainly of silicon and weaving thread's filaments exposed portions consisting mainly of carbon from the resulting images by utilizing the fact that those portions of tissue having a high atomic number demonstrate high luminance in backscattered electron images.

In the case of using polyurethane or copolymerized polyamide resin for the coating resin, instead of detecting the distribution of silicon, ruthenium distribution may also be detected as an indicator by exposing to and adsorbing a dyeing agent for electron microscope in the form of ruthenium tetraoxide followed by detecting the distribution of ruthenium as an indicator of the easily dyeable coating resin and poorly dyeable polyamide fibers.

The weaving thread's filaments exposure rate determined according to the above equation is 1% to 25% and preferably 2% to 20%. If the exposure rate is 1% or more, the effect of inhibiting adhesion of the coating resin is demonstrated, and the requirements of adequate deployment speed and favorable handling ease are satisfied. Adhesion between resin coated surfaces is inhibited as a result of the weaving thread's filaments being exposed by weaving thread protrusions on the surface of the base fabric. In addition, if exposure is greater than an exposure rate of 1% or more, separation charging between the fiber surface of the weaving thread and resin coating surface is further inhibited. Since contact between the fiber surface of the weaving thread and the resin coating surface consists of contact by the same substance at those portions where the weaving thread's filaments is exposed, in addition to eliminating charging attributable to differences in the electrification series, the portions where weaving thread's filaments is exposed are also thought to fulfill the role of allowing static charge to escape from the resin coating surface. In the case the weaving thread's filaments exposure rate is 25% or less, permeability of the base fabric is adequately inhibited and favorable internal pressure retention can be maintained.

Examples of synthetic fibers that can be used for the synthetic fibers that compose the base fabric for airbags of the present invention include polyamide fibers and polyester fibers. Among these, polyamide fibers are preferable, and although there are no particular limitations on the polyamide fibers provided they have amide bonds, fibers consisting mainly of polyhexamethylene adipamide are preferable, and fibers composed of a polyhexamethylene adipamide polymer (such as Nylon 66), having a melting point of 215° C. or higher, Nylon 66 fibers composed of Nylon 66 copolymer (Nylon 66/6, Nylon 66/61 or Nylon 66/610), and fibers composed of Nylon 66 polymers containing a polyamide-based polymer (Nylon 6 (polycarproamide) or Nylon 610 (polyhexamethylene sebacamide)) are particularly preferable in terms of heat resistance.

The synthetic fibers are multifilaments yarn that preferably have a filament, fineness of 1 dtex to 8 dtex. If filament's fineness is 1 dtex or more, filament is more easily exposed during coating. If fineness is 8 dtex or less, the base fabric has greater flexibility enabling it to be housed in a compact form. Moreover, the total fineness of the polyamide fibers is preferably 200 dtex to 750 dtex. If total fineness is 200 dtex or more, the base fabric satisfies the required level of mechanical properties required for use as an airbag base fabric. If total fineness of yarn is 750 dtex or less, the weight of the base fabric is reduced.

In addition, a heat-resistant stabilizer is preferably added to the polymer of the synthetic fibers, and in the case of polyamide fibers, for example, various types of copper compounds (including organic copper compounds such as copper acetate, copper halides such as copper iodide or copper bromide and the combined used thereof) can be used as heat-resistant stabilizers.

Figure 5:
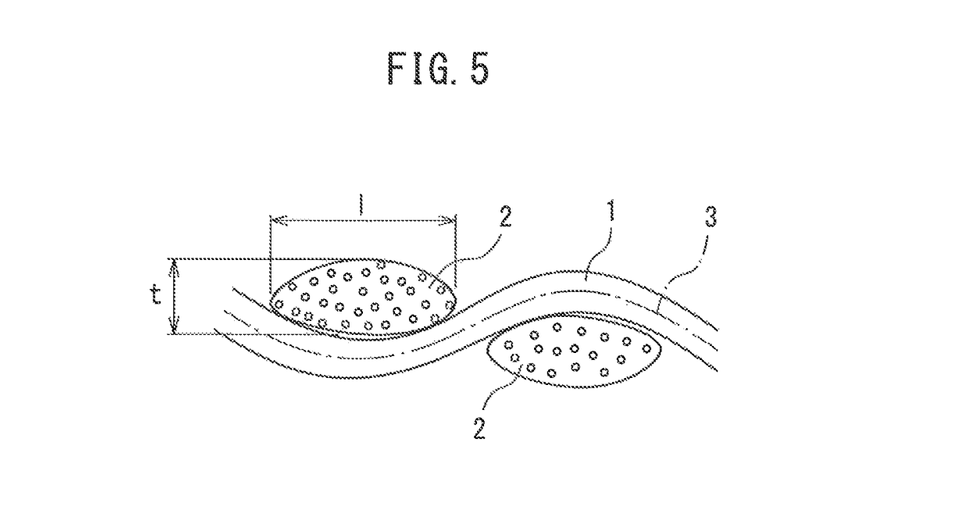
FIG. 5 is a drawing for explaining weaving thread flatness.

The base fabric of the present invention preferably has a suitable degree of surface irregularities in the surface thereof by converging group of filaments of the weaving thread composing the base fabric. The degree to which the groups of filaments of the weaving thread are converged can be expressed by the degree of flatness of the weaving thread. FIG. 5 is a schematic diagram of a cross-section of the base fabric when taking a cross-section in the direction of thickness thereof that passes through the center line of the warp yarn. In FIG. 5, reference number 1 indicates the warp yarn, reference number 2 indicates the weft yarn, and reference number 3 indicates the center line of the warp yarn. In addition, t represents the spread of the weft yarn 2 in the direction of base fabric thickness, and l represents the spread in the lengthwise direction of the weft yarn 2. In the present description, l/t is referred to as the flatness of the weft yarn. Similarly, flatness of the warp yarn can be determined from a cross-section that passes through the center line of the weft yarn.

The flatness of warp yarn and weft yarn determined in this manner is preferably 6.0 to 2.0 in both cases, and more preferably 5.0 or less. If weaving thread flatness is 6.0 or less, filaments convergence is favorable and surface irregularities of the weaving thread in the surface of the base cloth are suitably present, thereby contributing to improvement of the weaving thread's filaments exposure rate during resin coating.

The number of interlaces of the weaving thread is preferably 15 counts/m to 35 counts/m in order to inhibit flatness of the weaving thread. Weaving the base fabric by using weaving thread having a number of interlaces within the aforementioned range makes it possible to improve filaments convergence of the weaving thread in the base fabric and inhibit flatness of the weaving thread. Moreover, it is also effective to inhibit warp yarn tension during weaving, and weaving at a tension of preferably 0.5 cN/dtex or less contributes to inhibition of flatness of the weaving thread.

The weaving thread is preferably provided untwisted and unsized. In the case of weaving the base fabric by twisting the weaving thread, although convergence improves as a result of flatness of the weaving thread becoming less than 2.0, for example, surface irregularities in the surface of the base fabric becomes excessively large, the resin is inadequately embedded in the shape of the surface irregularities during lightweight coating and it becomes difficult to produce a base fabric having a uniform amount of coating. In addition, in the case of weaving the base fabric by gluing to the weaving thread, although it is necessary to completely remove the sizing agent in the scouring step after weaving, at that time, oil components to be subsequently described end up also being completely removed, thereby making this undesirable.

The base fabric of the present invention has resin arranged on at least one side of the fabric, and the adhered amount of resin is 10 g/m$^2$ to 50 g/m$^2$ and preferably 15 g/m$^2$ to 45 g/m$^2$. In the case the adhered amount of resin is 10 g/m$^2$ or more, a larger amount of resin results in greater inhibition of base fabric permeability and internal pressure retention is more favorable. If the adhered amount of resin is 50 g/m$^2$ or less, a smaller amount of resin makes the airbag base material more lightweight, which contributes to shorter deployment time (rapid deployment) while also causing the weaving thread's filaments exposure rate to increase, thereby inhibiting adhesion. If internal pressure retention to be subsequently described is high, both a small coated amount and low adhesion due to an increase in the weaving thread's filaments exposure rate act in coordination to contribute to shortening deployment time.

The viscosity of the coating liquid resin used when arranging the resin on at least one side in the present invention is preferably 15,000 cP to 500,000 cP, more preferably 20,000 or higher, even more preferably 25,000 cP or higher and particularly preferably 30,000 cP or higher. Since stress conformance of the resin becomes poor leading to leakage of gas attributable to stress during airbag deployment if the composition of the coating liquid resin consists mainly of a low molecular weight resin, the viscosity of the coating liquid resin is preferably 15,000 cP or higher. A higher value for the viscosity of the coating liquid resin results in less penetration into the fabric thereby causing the coating to be in the form of a deposited film and making it easier to apply a smaller coated amount in regions having high knife pressure. If the viscosity of the coating liquid resin is 500,000 cP or lower, the coating liquid resin is able to be applied uniformly and there is no occurrence of uneven coating. If the composition of the coating liquid resin mainly consists of a highly viscous, high molecular weight resin, density of site where the fabric fibers and resin film are adhered is low, and since this leads to leakage of gas attributable to stress during airbag deployment after having been placed in a high-temperature, high-humidity environment in particular (after being subjected to heat and humidity environment), the viscosity of the coating liquid resin is preferably 500,000 cP or lower and even more preferably 300,000 cP or lower.

In the present invention, it is important that penetration of the resin into the fabric be controlled during coating. Exposure of weaving thread's filaments can be promoted by promoting penetration of resin into the fabric. Although a method that reduces viscosity of the coating liquid resin by adding an organic solvent can also be used to promote resin penetration in addition to reducing viscosity of the coating resin in the manner previously described, this should be avoided since it results in a poor production environment. In addition, if penetration of the resin into the fabric is promoted with an organic solvent, the coated base fabric becomes hard resulting in inferior storageability since the resin restrains the fabric fibers, thereby making this undesirable. In other words, a solvent-free coated base fabric is preferable. On the other hand, although the viscosity of the resin is increased to inhibit penetration thereof, in the case of a high molecular weight resin, there are problems with respect to poor adhesion with the fabric fibers after being subjected to heat and humidity environment. In order to solve such problems, coating is preferably carried out by adding a low molecular weight alkoxysilane. A low molecular weight alkoxysilane basically refers to a silane compound composed of a single molecule having a molecular weight of 500 to 120 or a molecule containing a framework having a low degree of polymerization, and preferably has two or more alkoxy groups substituted for silicon. Examples thereof include methyltrimethoxysilane, methyltriethoxysilane, dimethyldimethoxysilane, dimethyldiethoxysilane and tetraethoxysilane. The low molecular weight alkoxysilane is preferably added at 1% by weight to 10% by weight to the coating liquid resin. The addition of a low molecular weight alkoxysilane at 1% by weight or more results in promotion of penetration due to dilution effects, making it possible to expose weaving thread's filaments. The weaving thread's filaments exposure rate can be further increased by increasing the amount added. On the other hand, since a low molecular weight alkoxysilane promotes an adhesion reaction between the resin and fabric fibers until completion of thermal crosslinking of the silicone resin, adhesiveness can be strengthened, local peeling during high pressure loading is eliminated even if only a small amount is coated, and internal pressure retention can be improved. Thus, as a result of adding a low molecular weight alkoxysilane to the coating liquid resin, in addition to being able to realize a form in which weaving thread's filaments is exposed, airbag properties in the form of internal pressure retention at a low coated amount can be improved. In addition, since the effect of diluting the coating liquid resin is lost by an adhesion reaction, the coated amount does not become excessive as a result of excessively promoting resin penetration and the base fabric does not become hard causing inferior storageability. If the added amount is 10% by weight or less, the formation of air bubble defects in the resin layer caused by decomposition gas accompanying the reaction is prevented.

Moreover, another method for promoting penetration consists of adjusting the viscosity of the resin by adding the same type of low viscosity resin component that cures by crosslinking to the main resin component that is cured by crosslinking. For example, a mixture of a high viscosity main resin component, namely that having a high degree of polymerization, and a resin component having low viscosity, namely that having a low degree of polymerization, can be used for the coating liquid resin, and the resulting mixture can be adjusted to the viscosity of the aforementioned resin coating liquid that is suitable for obtaining a desired value for the coated amount in terms of the entire resin composition after coating. In this case, exposure of weaving thread's filaments can be promoted by the effect of the low viscosity resin component. The viscosity of the low viscosity resin component is preferably 10,000 cP or less in order to promote single yarn exposure. In addition, the viscosity of the low viscosity resin component is preferably 500 cP or more, thereby enabling the obtaining of a composition that does not contain volatile silicone components harmful to electronic components. Moreover, the low viscosity resin component is also able to contribute to internal pressure retention as a result of the component per se contributing to a curing vulcanization reaction.

The resin is used to make the fabric surface impermeable to air, and examples of resins used include silicone, polyurethane and polyamide. Silicone is particularly preferable since it is flexible and does not cause cracking of the coating even under cold conditions, is comparatively resistant to combustion, and can be expected to contribute to flame retardation of the base fabric. In the case of silicone, a resin composition that undergoes thermal crosslinking by an addition reaction is preferable, and a composition can be used that is obtained by adding an addition reaction catalyst to a terminal alkenyl polyorganosiloxane using hydrogen silicone as a crosslinking agent.

Although there are no particular limitations on the method used to coat the resin in the present invention, coating with a knife coater is preferable, and floating knife coating is particularly preferable. The contact pressure between the knife and base fabric when coating the base fabric is preferably 0.5 N/cm to 20 N/cm and more preferably 1.0 N/cm to 10 N/cm. In the case the contact pressure is 0.5 N/cm or more, the coated amount decreases since a higher contact pressure results in a lower coated amount. Moreover, it becomes easier to expose weaving thread's filaments present on the apices of surface irregularities attributable to the warp yarn and weft yarn on the surface of the fabric, resulting in a higher weaving thread's filaments exposure rate. If the contact pressure is 20 N/cm or less, there is no damage to the base fabric and decreases in physical properties of the base fabric or decreases in processing quality do not occur.

In the case of dip coating, the weaving thread's filaments exposure rate on the surface of the coated base fabric increases, reaching from 50% to about 100%. Since resin generally is present within the fabric, it is difficult to make the coated base fabric impermeable to air. Moreover, as a result of lowering the viscosity of the coating liquid, the molecular weight of the resin decreases and air permeability increases when subjected to a load. In addition, storageability becomes inferior since the resin ends up being confined inside the fabric thereby resulting in a hard finish. In the case of gravure coating, since the resin is applied in the form of dots on the surface of the coated base fabric, weaving thread exposure rate becomes high, reaching about 50%. A gravure coated layer does not have a function that makes the base fabric impermeable to air at this time.

In the present invention, the solvent-extracted oil content of the base fabric in which resin has been arranged is preferably 0.15% by weight to 0.005% by weight. Solvent-extracted oil refers to that which is derived from the process oil agent used to produce and facilitate handling of synthetic fibers. In general, the process oil agent contains a surfactant for preventing frictional electrification, and although the containing of such a process oil agent is effective for preventing electrification in fabrics as well, it conversely inhibits adhesion between the resin and fabric fibers. If the solvent-extracted oil content is 0.15% by weight or less, adhesion between the resin and fabric fibers is favorable and air permeability when a differential pressure load has been applied is inhibited. Decreases in adhesion between the resin and fabric fibers after being subjected to heat and humidity environment in particular can be prevented. As a result, retention of internal pressure after being subjected to heat and humidity environment is maintained. On the other hand, the presence of a trace amount of solvent-extracted oil is effective for maintaining tear strength, and the content thereof is preferably 0.005% by weight or more. In the present invention, electrification is inhibited despite using only a trace amount of solvent-extracted oil due to the weaving thread's filaments being exposed on the resin surface.

A step for removing the process oil agent used to facilitate handling of synthetic fibers is preferably provided in order to make the solvent-extracted oil content of the base fabric 0.15% by weight or less. In the weaving step, the use of a water jet loom, in which oil drops off with water during weaving, is preferable to the use of an air jet loom, in which the oil content of synthetic fibers is basically maintained as is. In addition, a scouring step is preferably provided after weaving. Oil content can be reduced by selecting suitable conditions such as providing a residence time of 30 seconds or more in water at 60° C. or higher.

The preferable range of air permeability of the base fabric of the present invention is 0.1 cc/cm$^2$/sec or less as determined according to the Frazier method, and rapid airbag deployment can be anticipated by being impermeable to air such that air permeability is basically not detected.

The base fabric of the present invention is preferably air impermeable in that the value of dynamic air permeability as determined by measuring air permeability when applying an instantaneous air pressure load of up to about 100 kPa is 100 mm/s to 0 mm/s and more preferably 20 mm/s or less. As a result, there is no occurrence of peeling of the resin film due to deflection of the base fabric caused by air pressure or permeation of air caused by destruction of the resin film per se.

The base fabric of the present invention has a long internal pressure retention time even if the sewn air bag is instantaneously loaded with air pressure. Permeation of air through the base fabric, excluding leakage of air through the seams, is inhibited resulting in a long internal pressure retention time. Internal pressure retention time is preferably 500 ms or longer, which is advantageous for passenger protection.

In addition, the base fabric of the present invention has a form such that resin penetrates the fabric fibers even though a portion of the fabric filament are exposed on the surface, and since there is superior adhesion of the resin film to the fabric fibers, the base fabric demonstrates superior stability after being subjected to heat and humidity environment resulting in a long internal pressure retention time after being subjected to heat and humidity environment. Internal pressure retention time after being subjected to heat and humidity environment is preferably 500 ms or longer, which is advantageous for passenger protection. Moreover, dynamic air permeability after being subjected to heat and humidity environment is inhibited. Dynamic air permeability after being subjected to heat and humidity environment is preferably 20 mm/s or less, which is also advantageous for passenger protection.

When weaving a fabric for the base fabric of the present invention, a water jet loom, air jet loom or other type of loom can be used, and there are no limitations on the type of loom used.

In addition, with respect to weave as well, the fabric may be of a plain weave, twill weave or other type of weave, and there are no limitations on the type of weave used. However, a plain weave is preferable in order to more uniformly distribute filaments exposed sites attributable to the weaving thread structure of the fabric.

As a result of inhibiting electrostatic charging due to separation, the base fabric of the present invention can be imprinted with production information by inkjet printing in the production process. In the case of inhibiting electrostatic charging due to separation, there is no distortion of inkjet printing caused by the base fabric becoming charged during printing, and legible characters can be printed. The level of electrostatic charging due to separation is preferably 1000 V or less.

The base fabric of the present invention can be used to compose an airbag, and that airbag can be used in an airbag device that can be incorporated in a vehicle.

EXAMPLES

The following provides a detailed explanation of the present invention through examples thereof. However, the present invention is not limited to only these examples. Furthermore, the definitions and measurement methods of physical properties and the like used in the description and examples are as indicated below.

1) Weaving Density

Weaving density was measured in accordance with JIS L-1096:2010 (8.6).

2) Silicone Viscosity

Silicone viscosity was measured based on JIS Z8803:2011 (8) using a B type viscometer under conditions of a constant temperature bath temperature of 25° C.

3) Amount of Adhered Resin:

The amount of adhered resin was measured in accordance with JIS K6404-2-2:1998. However, in the case of silicone coating, the amount of adhered resin was determined from the amount of coating resin remaining after dissolving polyamide fabric with formic acid and subtracting from the base fabric.

4) Weaving Thread's Filaments Exposure Rate:

The surface of the silicone coating side of the fabric was photographed under the conditions indicated below with an SEM system (S3400N, Hitachi, Ltd.) and EDX system (INCAx-ac, Oxford Instruments plc) followed by processing the photographs by image processing to obtain the distributions of silicon (Si) derived from silicone on the surface of the base fabric. A generally uniform distribution of silicon was observed at those locations where a silicone film was present on the surface of the base fabric. On the other hand, a distribution of carbon (C) density that exceeded the background level that consisted of carbon coated for SEM observation was observed at those locations where a silicone coating was not present on the surface of the base fabric, and images were able to be confirmed to be obtained that coincided with the SEM observation of exposed portions of weaving thread's filaments composed of polyamide.

Figure 3:
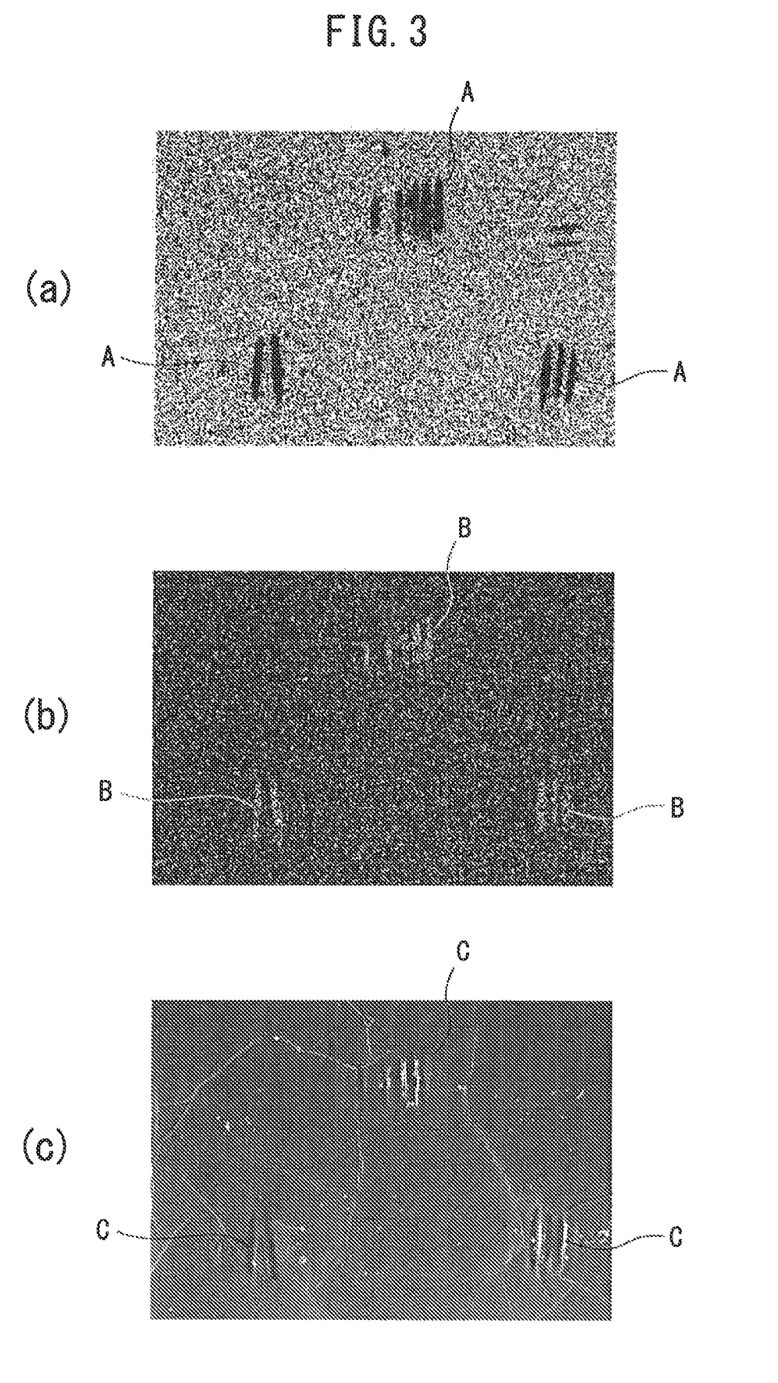
FIG. 3 indicates other examples of photographs depicting the distribution of silicone and carbon on the surface of a silicone-coated base fabric obtained according to the present invention.

Pretreatment: Carbon coating (100 Å to 200 Å)
Accelerating voltage: 15 kV
Working distance: 10 mm
Mapping collection time: Approx. 220 seconds FIGS. 2(a) and 3(a) indicate images of silicon (Si) distribution mapping, while FIGS. 2(c) and 3(c) indicate the results of SEM observation.

The area where silicon is absent (S1) was measured based on the image of the silicon mapping distribution diagram of FIG. 2(a) for those sites where weaving threads were observed to be exposed by SEM observation, and the weaving thread's filaments exposure rate was calculated according to the equation below.

$$\text{Weaving thread's filaments exposure rate (\%)} = (S1/S0) \times 100$$

In the above equation, S0 represents the photographed area, and is the area surrounded by the apices of protrusions derived from the warp yarn and the apices of protrusions derived from the weft yarn as shown in FIG. 1. An area was selected for the photographed area so as to contain at least four protrusion apices, and the outline thereof lies intermediate to the adjacent warp and weft yarns. In FIGS. 2(a) and 3(a), those portions indicated by "A" indicate portions where silicon is absent and where filament of the weaving thread (warp yarn and weft yarn) are exposed on the surface of the coating resin. Five locations were evaluated as the photographed area and the average thereof was determined.

5) Solvent-Extracted Oil Content:

Extraction was carried out by refluxing for 4 hours according to the Soxhlet method indicated in section 8.32 (oil and fat content) of JIS L1096:2010 using cyclohexane for the solvent. In addition, coated base fabric was obtained by suitably cutting out pieces of the samples, and oil was extracted from 50 g of sample followed by evaluation of oil content.

Figure 4:
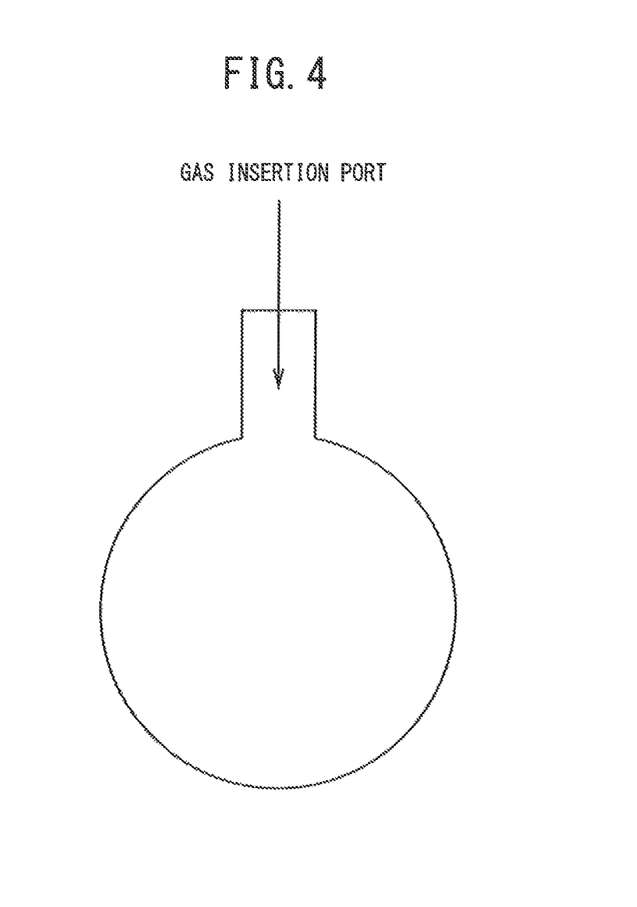
FIG. 4 is a drawing indicating a model airbag used in the examples.

6) Deployment Time:

A model airbag having a diameter of 50 cm that was fabricated as shown in FIG. 4 and having the coated surfaces of two base fabric samples facing to the inside was placed in a hot air oven after rolling into the shape of a roll having a diameter of within 25 mm followed by allowing to stand for 408 hours at 105° C.

The model airbag was attached to the CGS System manufactured by Microsys Co., Ltd., He gas (6 MPa, 1 L) was rapidly injected through the gas insertion port, and deployment behavior was observed with a high-speed VTR at the side direction from a gas blowout port. The amount of time required for the airbag to expand and deploy to a location 30 cm in front of the end of the He gas blowout port was measured.

7) Internal Pressure Retention Time:

The amount of time required for the maximum pressure generated when He gas (6 MPa, 1 L) was rapidly injected through the gas insertion port into a model airbag, having a diameter of 50 cm fabricated in the same manner as the aforementioned section 6), using the CGS System manufactured by Microsys Co., Ltd. to fall to half of that maximum pressure was measured. Internal pressure retention time was evaluated as "F" when there was considerable leakage of gas and internal pressure did not reach 50 kPa.

8) Internal Pressure Retention Time after Being Subjected to Heat and Humidity Environment:

The same model airbag as used in the aforementioned section 6) was allowed to stand for 400 hours at 95% RH and 80° C. followed by measuring internal pressure retention time in the same manner as the aforementioned section 7).

9) Post-Heat Treatment Tackiness:

Evaluations were carried out in compliance with ISO5978. A piece measuring 5 cm on a side was sampled from the base fabric and placed on a sample stand after superimposing two sample pieces with the coated surfaces facing to the inside, a stainless steel sheet also measuring 5 cm on a side was then superimposed with the sample, and a 50 N weight was placed thereon. The sample and weight were placed in a hot air oven as is and allowed to stand for 408 hours at 105° C. Subsequently, the time required for the other sample piece to separate off and fall under its own weight after picking up one of the sample pieces while in the standard state described in JIS L0105 was taken to be time 0 (seconds). If the other sample piece did not fall off under its own weight, a 50 g weight was attached to the other sample piece followed by measurement of the amount of time (seconds) until it peeled off and fell off. The amount of time in the case of immediately falling off under the 50 g weight was recorded as less than 1 second.

10) Air Permeability:

Air permeability was evaluated using JIS L1096:2010 (8.26.1) (Frazier method).

11) Dynamic Air Permeability:

Air permeability at 50 kPa was measured by measuring air permeability using the FX3350 manufactured by Textest AG at a filling pressure of 300 kPa, filling volume of 400 cc and with the coated surface of the sample facing up, or in other words, positioned on the filling tank side. In the case measurement was unable to be carried out normally as a result of pressurized air compressed in the filling tank failing to be released, this was taken to mean that the flow of air was substantially not observed, and air permeability was evaluated as 0 mm/s.

12) Dynamic Air Permeability over Time in Presence of Wet Heat:

A base material sample was folded in the shape of the letter "Z" at a width of 2 cm, the folds were placed between plates measuring 12 cm on a side and a 9.8 N weight was placed thereon followed by exposing to an environment at 95% RH and 50° C., removing the weight to return to the standard state, and measuring dynamic air permeability as defined in the previous section with the folded portion in the center.

13) Electrostatic Charging Due to Separation:

A roll of airbag base fabric was unrolled at the rate of 50 m/min, and the surface potential of the coated surface was measured at a location of 6 m. The measuring environment was at a room temperature of 25° C. and humidity of 50% RH. The detection unit of the Statiron-DZ3 electrostatic potentiometer (Shishido Electrostatic, Ltd.) was placed at a location 5 cm from the base fabric, measurements were made at 25 cm intervals in the direction of width, and the maximum value thereof was used as the separation charge potential (V).

14) Weaving Thread Flatness (Warp Yarn Flatness, Weft Tarn Flatness):

The base fabric was cut in the direction of thickness at a central portion of the warp yarn or weft yarn to obtain a weft yarn cross-section and warp yarn cross-section, respectively. The cross-sections were observed by SEM imaging and the ratio (l/t) of the spread of single yarn in the direction of the warp yarn or weft yarn (l) to the spread of single yarn in the direction of the thickness of the base fabric (t) was determined as the flatness of the weaving thread. Measurements were made at five locations each on the upper and lower surfaces of the base fabric (total of 10 locations) followed by determining the average value thereof.

15) Number of Interlaces of Weaving Thread Original Yarn:

Knowing a portion in which filaments was interlaced within a length of 1 cm as determined according to the water immersion method as an interlaced portion, the number of interlaces were measured over a length of 50 cm and converted to the number per 1 meter. Ten original yarns were measured and the results were indicated as the average value thereof. The water immersion bath used measured 70 cm long, 15 cm wide and 5 cm deep, and dividers were provided at locations 10 cm from both ends in the lengthwise direction. The bath was filled with pure water, the original yarn sample was placed therein, and the number of interlaces was measured. The pure water was replaced for each measurement to eliminate effects of oil agents and other impurities.

16) Inkjet Printability:

Simultaneous to measuring electrostatic charging due to separation, bar codes were printed on a non-coated surface by inkjet printing at those locations where charging potential was measured. Code 39 bar codes were printed at a width of 10 mm using a 60 micron nozzle inkjet printer and ethanol-based black ink. Printing quality of the printed surface was ranked with a bar code symbol verifier in compliance with JIS X0520:2001, and printing quality of rank A or B was evaluated with "E", rank C or D was evaluated with "C", and rank E or lower was evaluated with "F".

Examples 1 to 3

A plain weave fabric was obtained using round cross-section multifilament thread having an interlace count of 20 counts/m and composed of untwisted Nylon 66 fibers having a total fineness of 235 dtex, filament count of 72 and strength of 8.5 cN/dtex, followed by adjusting the weaving density of both the warp yarn and weft yarn to 72 yarns/2.54 cm with a water jet loom. The fabric was then spread out and washed for 1 minute in a three-stage water bath at 80° C. and then dried at 110° C. Next, after coating this fabric with a coating liquid resin, obtained by adding 8% by weight of tetraethoxysilane (TES) to an addition reaction-crosslinked silicone liquid consisting mainly of a non-solvent-type methyl vinyl silicone resin having viscosity of 60,000 cP, using a floating knife coater so that the contact pressure between the fabric and the knife was 15 N/cm, 10 N/cm or 2 N/cm, vulcanization treatment was carried out for 2 minutes at 190° C. to obtain an airbag base fabric.

FIG. 2 indicates a micrograph of the distribution of silicon on the surface of the silicone-coated base fabric of Example 1 along with a micrograph of the distribution of carbon and the results of SEM observation.

Example 4

An airbag base fabric was obtained in the same manner as Example 3 with the exception of using a coating liquid resin obtained by adding 8% by weight of tetraethoxysilane to an addition reaction-crosslinked silicone liquid having viscosity of 100,000 cP. FIG. 3 indicates a micrograph of the distribution of silicon on the surface of the silicone-coated base fabric of Example 4 along with a micrograph of the distribution of carbon and the results of SEM observation.

Example 5

An airbag base fabric was obtained in the same manner as Example 3 with the exception of using a coating liquid resin obtained by adding 2% by weight of tetraethoxysilane to an addition reaction-crosslinked silicone liquid having viscosity of 60,000 cP.

Example 6

A plain weave fabric was obtained with an air jet loom using round cross-section multifilament thread having an interlace count of 20 counts/m and composed of untwisted Nylon 66 fibers having a total fineness of 470 dtex, filament count of 72 and strength of 8.5 cN/dtex. Next, after coating this fabric with a coating liquid resin, obtained by adding 8% by weight of tetraethoxysilane to an addition reaction-crosslinked silicone liquid having viscosity of 60,000 cP, using a floating knife coater while maintaining the contact pressure between the fabric and the knife at 10 N/cm, vulcanization treatment was carried out for 2 minutes at 190° C. to obtain an airbag base fabric. The weaving density of both the warp yarn and weft yarn of the base fabric was 51 yarns/2.54 cm.

Example 7

An airbag base fabric was obtained in the same manner as Example 3 with the exception of using a coating liquid resin obtained by adding 8% by weight of tetraethoxysilane to an addition reaction-crosslinked silicone liquid having viscosity of 30,000 cP.

Example 8

An addition reaction-crosslinking silicone liquid having viscosity of 30,000 cP was obtained by combining alkenyl silicone components of a reaction-crosslinking silicone liquid having viscosities of 60,000 cP and 5,000 cP without adding tetraethoxysilane, and this was then used as a coating liquid resin. An airbag base fabric was obtained in the same manner as Example 3 with the exception of using this coating liquid resin.

The properties of the airbag base fabrics of Examples 1 to 8 obtained in the manner described above are shown in Table 1. These airbag base fabrics demonstrated superior weavability, rapid deployment speed, favorable internal pressure retention and ease of handling.

Example 9

An airbag base fabric was obtained in the same manner as Example 5 with the exception of using a round cross-section multifilament thread having an interlace count of 12 counts/m and composed of untwisted Nylon 66 fibers having a total fineness of 235 dtex, filament count of 72 and strength of 8.5 cN/dtex. The properties of the resulting airbag base fabric are shown in Table 1. The airbag base fabric demonstrated superior weavability, rapid deployment speed, favorable internal pressure retention and ease of handling.

Example 10

An airbag base fabric was obtained in the same manner as Example 5 with the exception of using a round cross-section multifilament thread having an interlace count of 5 counts/m and composed of untwisted Nylon 66 fibers having a total fineness of 235 dtex, filament count of 72 and strength of 8.5 cN/dtex. The properties of the resulting airbag base fabric are shown in Table 1. Although this airbag base fabric had a lower weaving thread's filaments exposure rate, it demonstrated superior weavability, rapid deployment speed, favorable internal pressure retention and ease of handling.

Comparative Example 1

An airbag base fabric was obtained in the same manner as Example 3 with the exception of not adding tetraethoxysilane to an addition reaction-crosslinked silicone liquid having viscosity of 12,000 cP. The properties of the resulting airbag base fabric are shown in Table 1.

Since weaving thread's filaments was not exposed on the coated surface resulting in adhesion over time, time was required for the airbag to deploy. In addition, this base fabric also demonstrated air permeability with respect to dynamic air permeability under a load. Moreover, in evaluating the bag form, gas leaked when the fabric was folded up into the shape of a roll and when subjected to a load generated by rapid inflow of gas, deployment time was long, and internal pressure retention was poor. Air permeability increased with respect to dynamic air permeability after being subjected to heat and humidity environment. Moreover, the fabric was susceptible to electrostatic charging due to separation and inkjet printing quality was poor due to the effect thereof.

Comparative Example 2

An airbag base fabric was obtained in the same manner as Example 1 with the exception of not adding tetraethoxysilane to an addition reaction-crosslinking silicone liquid having viscosity of 12,000 cP and changing the knife contact pressure to 7 N/cm. The properties of the resulting airbag base fabric are shown in Table 1.

Although the base fabric was coated at low viscosity, the resin was unable to completely penetrate into the fabric during high contact pressure coating, resulting in a decrease in the coated amount. Although there was slight exposure of the weaving thread's filaments, adhesion was unable to be inhibited, deployment time was long, and internal pressure retention was poor due to leakage of gas when subjected to a pressure load. Inhibition of separation charging was also not observed.

Comparative Example 3

A plain weave fabric was obtained with an air jet loom using round cross-section multifilament thread having an interlace count of 20 counts/m and composed of untwisted Nylon 66 fibers having a total fineness of 350 dtex, filament count of 72 and strength of 8.5 cN/dtex. Next, after coating this fabric with a coating liquid resin, obtained by adding 8% by weight of tetraethoxysilane to an addition reaction-crosslinking silicone liquid having viscosity of 60,000 cP, using a floating knife coater while maintaining the contact pressure between the fabric and the knife at 10 N/cm, vulcanization treatment was carried out for 2 minutes at 190° C. to obtain an airbag base fabric. The weaving density of both the warp yarn and weft yarn of the base fabric was 67 yarns/2.54 cm. The properties of the resulting airbag base fabric are shown in Table 1.

There was only slight exposure of the weaving thread's filaments on the coated surface, and since there was adhesion after heat treatment and leakage of gas when subjected to a pressure load, time was required for deployment and internal pressure retention was also poor. Inhibition of electrostatic charging due to separation was also not observed.

Comparative Example 4

An airbag base fabric was obtained in the same manner as Example 1 with the exception of adding 12% by weight of tetraethoxysilane to an addition reaction-crosslinking silicone liquid having viscosity of 30,000 cP and changing the knife contact pressure to 13 N/cm. The properties of the resulting airbag base fabric are shown in Table 1.

Due to the excessive addition of tetraethoxysilane, numerous weaving thread's filaments were exposed and there was no adhesion. However, there was considerable leakage of gas resulting in a long deployment time and the absence of internal pressure retention.

Comparative Example 5

An airbag base fabric was obtained in the same manner as Example 3 with the exception of not adding tetraethoxysilane to an addition reaction-crosslinked silicone liquid having viscosity of 20,000 cP. The properties of the resulting airbag base fabric are shown in Table 1.

Since there were no weaving thread's filaments exposed on the coated surface and adhesion was present after heat treatment, time was required for deployment. In addition, air permeability was demonstrated during measurement of dynamic air permeability under a load, deployment time was long and internal pressure retention was poor. Moreover, electrostatic charging due to separation occurred and inkjet printing quality was poor due to the effect thereof.

Comparative Example 6

An airbag base fabric was obtained in the same manner as Example 3 with the exception of not adding tetraethoxysilane to an addition reaction-crosslinking silicone liquid having viscosity of 30,000 cP. The properties of the resulting airbag base fabric are shown in Table 1.

Since there were no weaving thread's filaments exposed on the coated surface and adhesion was present after heat treatment, time was required for deployment. In addition, air permeability was demonstrated during measurement of dynamic air permeability under a load, deployment time was long and internal pressure retention was poor. Moreover, electrostatic charging due to separation occurred and inkjet printing quality was poor due to the effect thereof.

Comparative Example 7

An airbag base fabric was obtained in the same manner as Example 3 with the exception of not adding tetraethoxysilane to an addition reaction-crosslinking silicone liquid having viscosity of 60,000 cP. The properties of the resulting airbag base fabric are shown in Table 1.

Since there were no weaving thread's filaments exposed on the coated surface and adhesion was present after heat treatment, time was required for deployment. Moreover, electrostatic charging due to separation occurred and inkjet printing quality was poor due to the effect thereof.

Comparative Example 8

An airbag base fabric was obtained in the same manner as Example 3 with the exception of not adding tetraethoxysilane to an addition reaction-crosslinking silicone liquid having viscosity of 100,000 cP. The properties of the resulting airbag base fabric are shown in Table 1.

In addition to there being no weaving thread's filaments exposed on the coated surface and the presence of adhesion after heat treatment, the base fabric was heavy and time was required for deployment. Moreover, electrostatic charging due to separation occurred and inkjet printing quality was poor due to the effect thereof.

Comparative Example 9

An airbag base fabric having a coated amount of silicone of 15 g/m² was obtained by immersing the 235 dtex plain weave fabric described in Example 1 in an addition reaction-crosslinking silicone emulsion liquid consisting mainly of methyl vinyl silicone resin in the form of an aqueous emulsion followed by wringing out the fabric, drying for 2 minutes at 120° C. and carrying out vulcanization treatment for 2 minutes at 190° C.

Although the weaving thread's filaments exposure rate of the base fabric was 100% and the base fabric did not demonstrate adhesion, air permeability was high and internal pressure was unable to be retained. Although the electrostatic charging potential due to separation was low, ink bled during inkjet printing due to the effect of excessive penetration of the coating resin into the base fabric, thereby resulting in poor printability.

Comparative Example 10

Comparative Example 10 was carried out in the same manner as Example 1 with the exception of weaving the airbag base fabric with an air jet loom and coating the base fabric without scouring. Roughly all of the spinning oil remained in the fabric, electrostatic charging due to separation was inhibited, and inkjet printing was legible. However, after being subjected to heat and humidity environment, dynamic air permeability increased accompanying separation of the resin film during loading and internal pressure retention was also poor.

Comparative Example 11

Comparative Example 11 was carried out in the same manner as Example 1 with the exception of weaving the airbag base fabric with a water jet loom and coating the base fabric without scouring. Spinning oil still remained in the fabric, electrostatic charging due to separation was inhibited, and inkjet printing was legible. After being subjected to heat and humidity environment, air permeability increased accompanying separation of the resin film during loading and internal pressure retention was also poor.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Total fineness | 235 dtex | 235 dtex | 235 dtex | 235 dtex | 235 dtex | 470 dtex | 235 dtex | 235 dtex | 235 dtex | 235 dtex |
| Weaving density (warp × weft, yarns/inch) | 72 × 72 | 72 × 72 | 72 × 72 | 72 × 72 | 72 × 72 | 51 × 51 | 72 × 72 | 72 × 72 | 72 × 72 | 72 × 72 |
| Coating liquid resin viscosity (cP) | 60,000 | 60,000 | 100,000 | 60,000 | 60,000 | 60,000 | 30,000 | 30,000 | 60,000 | 60,000 |
| TES % | 8 | 8 | 8 | 8 | 2 | 8 | 8 | — | 2 | 2 |
| Knife contact pressure (N/cm) | 15 | 10 | 2 | 2 | 2 | 10 | 2 | 2 | 2 | 2 |
| Adhered amount of resin (g/m²) | 10 | 15 | 25 | 45 | 22 | 20 | 20 | 18 | 22 | 22 |
| Weaving thread's filaments exposure rate (%) | 20 | 12 | 8 | 3 | 4 | 18 | 18 | 3 | 2 | 1.5 |
| Solvent-extracted oil content (%) | 0.08 | 0.08 | 0.08 | 0.08 | 0.08 | 0.08 | 0.08 | 0.08 | 0.08 | 0.08 |
| Warp yarn flatness | 4.48 | 4.48 | 4.48 | 4.48 | 4.48 | 4.12 | 4.48 | 4.48 | 5.48 | 5.81 |
| Weft yarn flatness | 3.48 | 3.48 | 3.48 | 3.48 | 3.48 | 3.28 | 3.48 | 3.48 | 4.51 | 5.02 |
| Electrostatic Charging due to Separation (V) | 450 | 500 | 520 | 700 | 550 | 500 | 500 | 800 | 650 | 550 |
| Inkjet printability | E | E | E | E | E | E | E | E | E | E |
| Post-heat treatment viscosity (sec) | 0 | 0 | 0 | <1 | 0 | ◯ | ◯ | ◯ | <1 | <1 |
| Deployment time (ms) | 20 | 21 | 23 | 28 | 22 | 25 | 22 | 24 | 25 | 28 |
| Air permeability (cc/cm²/s) | 0 | 0 | 0 | 0 | 0 | 0 | 0 | 0 | 0 | 0 |
| Dynamic air permeability (mm/s) | 0 | 0 | 0 | 0 | 0 | 0 | 0 | 0 | 0 | 0 |
| Dynamic permeability over time in presence of wet heat (mm/s) | 0 | 0 | 0 | 0 | 0 | 0 | 0 | 0 | 0 | 0 |
| Internal pressure retention time (ms) | 600 | 650 | 750 | 1200 | 700 | 600 | 500 | 600 | 600 | 550 |
| Internal pressure retention time over time in presence of wet heat (ms) | 600 | 650 | 750 | 1200 | 700 | 600 | 500 | 550 | 600 | 550 |

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|
| Total fineness | 235 dtex | 235 dtex | 350 dtex | 235 dtex | 235 dtex | 235 dtex | 235 dtex | 235 dtex | 235 dtex | 235 dtex | 235 dtex |
| Weaving density (warp × weft, yarns/inch) | 72 × 72 | 72 × 72 | 67 × 67 | 72 × 72 | 72 × 72 | 72 × 72 | 72 × 72 | 72 × 72 | 72 × 72 | 72 × 72 | 72 × 72 |
| Coating liquid resin viscosity (cP) | 12,000 | 12,000 | 12,000 | 30,000 | 20,000 | 30,000 | 60,000 | 100,000 | EM | 60,000 | 60,000 |
| TES % | 0 | 0 | 0 | 12 | 0 | 0 | 0 | 0 | 0 | 8 | 8 |
| Knife contact pressure (N/cm) | 2 | 7 | 2 | 13 | 2 | 2 | 2 | 2 | dip | 15 | 15 |
| Adhered amount of resin (g/m²) | 10 | 7 | 15 | 15 | 13 | 15 | 18 | 38 | 15 | 10 | 10 |

TABLE 1-continued

| | | | | | | | | | | | |
|---|---|---|---|---|---|---|---|---|---|---|---|
| Weaving thread's filaments exposure rate (%) | 0 | 0.5 | 0.3 | 32 | 0 | 0 | 0 | 0 | 100 | 20 | 20 |
| Solvent-extracted oil content (%) | 0.08 | 0.08 | 0.08 | 0.08 | 0.08 | 0.08 | 0.08 | 0.08 | 0.08 | 0.98 | 0.21 |
| Warp yarn flatness | 4.48 | 4.48 | 4.15 | 4.48 | 4.48 | 4.48 | 4.48 | 4.48 | 4.48 | 4.48 | 4.48 |
| Weft yarn flatness | 3.48 | 3.48 | 3.23 | 3.48 | 3.48 | 3.48 | 3.48 | 3.48 | 3.48 | 3.48 | 3.48 |
| Electrostatic Charging due to Separation (V) | 1500 | 1500 | 1500 | 1600 | 1600 | 1600 | 1600 | 1700 | 900 | 300 | 450 |
| Inkjet printability | F | C | C | E | F | F | F | F | F | E | E |
| Post-heat treatment viscosity (sec) | 3 | 2 | 2 | 0 | 3 | 3 | 3 | 8 | 0 | 0 | 0 |
| Deployment time (ms) | 30 | 37 | 37 | 57 | 25 | 26 | 27 | 35 | 65 | 40 | 22 |
| Air permeability (cc/cm$^2$/s) | 0 | 0 | 0 | 0.2 | 0 | 0 | 0 | 0 | 0.3 | 0 | 0 |
| Dynamic air permeability (mm/s) | 30 | 80 | 70 | 180 | 0 | 0 | 0 | 0 | 400 | 100 | 10 |
| Dynamic permeability over time in presence of wet heat (mm/s) | 50 | 120 | 100 | 250 | 30 | 60 | 100 | 0 | 400 | 200 | 80 |
| Internal pressure retention time (ms) | 180 | 100 | 100 | 50 | 200 | 350 | 500 | 1000 | F | 50 | 200 |
| Internal pressure retention time over time in presence of wet heat (ms) | 150 | 80 | 80 | 50 | 150 | 220 | 300 | 500 | F | 30 | 150 |

INDUSTRIAL APPLICABILITY

According to the present invention, a base fabric for airbags demonstrating superior deployment speed, internal pressure retention and workability, and an airbag that uses that base fabric, are obtained.

DESCRIPTION OF THE REFERENCE NUMERALS

1 Warp yarn
2 Weft yarn
3 Warp yarn center line

The invention claimed is:

1. A base fabric for airbags having a resin arranged on at least one side of a fabric composed of synthetic fibers, wherein the coated amount of resin is 10 g/m$^2$ to 50 g/m$^2$, weaving thread's filaments are exposed on the resin surface, and the weaving thread's filaments exposure rate is 1% to 25%.

2. The base fabric for airbags according to claim 1, wherein the solvent-extracted oil content is 0.5% by weight to 0.005% by weight.

3. The base fabric for airbags according to claim 1 or 2, wherein the weaving thread flatness of a cross-section of the weaving thread is 2.0 to 6.0 for both the wrap yarn and weft yarn.

4. The base fabric for airbags according to claim 1 or 2, wherein the resin is silicone.

5. The base fabric for airbags according to claim 1 or 2, wherein the synthetic fibers are polyamide fibers.

6. The base fabric for airbags according to claim 1 or 2, wherein the base fabric has been inkjet-printed.

7. The base fabric for airbags according to claim 1 or 2, wherein the resin is arranged by coating a coating liquid resin onto the fabric surface.

8. The base fabric for airbags according to claim 7, wherein the viscosity of the coating liquid resin is 15,000 cP to 500,000 cP.

9. The base fabric for airbags according to claim 7, wherein 1% by weight to 10% by weight of a low molecular weight alkoxysilane is added to the coating liquid resin.

10. The base fabric for airbags according to claim 7, wherein the coating liquid resin contains a low viscosity resin component having viscosity in excess of 500 cP but less than 10,000 cP.

11. The base fabric for airbags according to claim 7, wherein the contact pressure between the base fabric and knife used during coating is 0.5 N/cm to 20 N/cm.

12. An airbag composed of the base fabric for airbags according to claim 1 or 2.

13. An airbag device that uses the airbag according to claim 12.

* * * * *